(12) United States Patent
Malia et al.

(10) Patent No.: US 10,544,610 B2
(45) Date of Patent: Jan. 28, 2020

(54) COMPOSITE LIVE HINGE

(71) Applicant: Lockheed Martin Corporation, Bethesda, MD (US)

(72) Inventors: Michael J. Malia, Owego, NY (US); Brian Kaplun, Endicott, NY (US); Dominick Consalvi, Vista, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 94 days.

(21) Appl. No.: 13/960,009

(22) Filed: Aug. 6, 2013

(65) Prior Publication Data

US 2015/0040349 A1    Feb. 12, 2015

(51) Int. Cl.
*E05D 1/00* (2006.01)
*B29C 45/00* (2006.01)
(Continued)

(52) U.S. Cl.
CPC .............. *E05D 1/00* (2013.01); *A63H 27/02* (2013.01); *B29C 45/14508* (2013.01); *B29C 45/14786* (2013.01); *B29C 45/1671* (2013.01); *B29C 65/02* (2013.01); *B29C 65/4835* (2013.01); *B29C 65/5021* (2013.01); *B29C 65/5028* (2013.01); *B29C 65/5042* (2013.01); *B29C 65/70* (2013.01); *B29C 66/1122* (2013.01); *B29C 66/1222* (2013.01); *B29C 66/1226* (2013.01); *B29C 66/12441* (2013.01); *B29C 66/43* (2013.01); *B29C 66/71* (2013.01); *B29C 66/721* (2013.01); *B29C 66/7292* (2013.01); *B29C 66/73751* (2013.01);
(Continued)

(58) Field of Classification Search
CPC .................................... E05D 1/00; E05D 1/02
USPC .......................................................... 16/225
See application file for complete search history.

(56) References Cited

U.S. PATENT DOCUMENTS 3,445,052 A * 5/1969 Lewallen ...................... 428/158
5,350,614 A    9/1994 Chase et al.
(Continued)

FOREIGN PATENT DOCUMENTS

CA          2179272 A1    8/1995

OTHER PUBLICATIONS

HobbyKing.com, Glass Wing Aileron Hinge—RC Groups, http://www.regroups.com/forums/showthread.php?t=1234698, dated Oct. 8, 2012, 3 pages.
(Continued)

*Primary Examiner* — Emily M Morgan
(74) *Attorney, Agent, or Firm* — Reising Ethington P.C.

(57) ABSTRACT

A hinged component includes first and second portions of material coupled together by a composite live hinge. The live hinge includes a layer of tensile fabric and a layer of elastomer interposed between the tensile fabric and the material of one or both of the coupled first and second portions. The composite live hinge is capable of joining structural composite materials without the need for scoring, and thereby weakening, the structural composite material along the desired hinge line. The live hinge can be embedded in the materials it joins in a method that is compatible with traditional structural composite layup processes and in a manner which prevents resin from the structural composite materials from infiltrating the tensile fabric and compromising its flexibility.

11 Claims, 4 Drawing Sheets

(51) Int. Cl.

| | | |
|---|---|---|
| *A63H 27/00* | (2006.01) | |
| *B29C 65/02* | (2006.01) | |
| *B29C 65/48* | (2006.01) | |
| *B29C 65/50* | (2006.01) | |
| *B29C 65/00* | (2006.01) | |
| *B29C 70/34* | (2006.01) | |
| *B29C 45/14* | (2006.01) | |
| *B29C 45/16* | (2006.01) | |
| *B29C 65/70* | (2006.01) | |
| *B64C 9/02* | (2006.01) | |
| *B29K 21/00* | (2006.01) | |
| *B29K 101/12* | (2006.01) | |
| *B29K 105/08* | (2006.01) | |
| *B29L 9/00* | (2006.01) | |
| *B29L 31/22* | (2006.01) | |

(52) U.S. Cl.
CPC ...... *B29C 66/73753* (2013.01); *B29C 70/345* (2013.01); *B64C 9/02* (2013.01); *B29C 45/14336* (2013.01); *B29K 2021/003* (2013.01); *B29K 2101/12* (2013.01); *B29K 2105/089* (2013.01); *B29L 2009/00* (2013.01); *B29L 2031/22* (2013.01); *E05Y 2800/45* (2013.01); *E05Y 2800/68* (2013.01); *Y10T 16/525* (2015.01)

(56) References Cited

U.S. PATENT DOCUMENTS

| | | | |
|---|---|---|---|
| 5,660,900 A * | 8/1997 | Andersen et al. | 428/35.6 |
| 5,941,480 A * | 8/1999 | Wille | B64C 3/48 |
| | | | 244/123.1 |
| 6,076,766 A * | 6/2000 | Gruensfelder | B64C 3/56 |
| | | | 244/130 |
| 6,474,945 B1 | 11/2002 | Nakasato et al. | |
| 6,588,709 B1 * | 7/2003 | Dunne et al. | 244/201 |
| 7,472,476 B2 * | 1/2009 | Gronquist | F16L 13/0272 |
| | | | 138/99 |
| 7,789,221 B2 | 9/2010 | Lapeyre et al. | |
| 8,999,474 B2 * | 4/2015 | Casteras | 428/57 |
| 2003/0086786 A1 * | 5/2003 | Mochida | B64C 27/33 |
| | | | 416/134 A |
| 2005/0236294 A1 | 10/2005 | Herbert et al. | |
| 2007/0000091 A1 | 1/2007 | Preigelmeir et al. | |
| 2011/0177279 A1 * | 7/2011 | Casteras | 428/53 |
| 2012/0034833 A1 * | 2/2012 | Schaube | B29C 70/086 |
| | | | 442/172 |
| 2012/0176736 A1 * | 7/2012 | Apgar et al. | 361/679.01 |
| 2014/0007377 A1 * | 1/2014 | Masini et al. | 16/225 |

OTHER PUBLICATIONS

HobbyKing.com, There Is a New Way To Do Live Hinges With Kevlar/Carbon Cloth-RC Groups, http://www.regroups.com/forums/showthread.php?t=517871, dated Oct. 8, 2012, 6 pages.
International Search Report for Application No. PCT/US2014/049974, dated Jan. 30, 2015, 3 pages.
Supplementary European Search Report for EP Pat App No. 14835349, dated Mar. 13, 2017.

* cited by examiner

US 10,544,610 B2

COMPOSITE LIVE HINGE

TECHNICAL FIELD

This application relates generally to live hinge structures that provide hinged movement between components via material flexure.

BACKGROUND

Conventional hinges are used to attach two or more components together so that the components are moveable relative to each other with one rotational degree of freedom and typically about a pivot axis. Some hinges include dedicated components that move relative to each other, such as a pin and barrel, where the pin defines the pivot axis and an inner cylindrical surface of the barrel rides along an outer surface of the pin. Another type of hinge is a live hinge or living hinge. A typical living hinge is formed at a joint between two portions of the same piece of material and is thus made from the same material as the two portions of material it joins. This type of live hinge allows hinged movement between the portions of the piece of material on opposite sides of the hinge by flexure or bending of the material along a hinge line. Living hinges function without the friction and wear associated with other types of hinges. The location of a living hinge joint is often determined by a thinned or otherwise weakened area in the monolithic component.

SUMMARY

In accordance with one embodiment, a hinged component includes a first portion of material, a second portion of material, and a live hinge attaching the first and second portions of material together at a hinge region. The live hinge includes a layer of tensile fabric and a layer of elastomer interposed between the tensile fabric and the material of at least one of the first and second portions where the live hinge is attached to each of the first and second portions.

In accordance with another embodiment, a method of making a hinged component includes the steps of: (a) overlapping a layer of tensile fabric with a layer of elastomer; (b) locating the overlapped layers in a component forming tool; (c) introducing polymer-based material into the forming tool, so that a first portion of polymer-based material overlaps one end of the layered materials and a second portion of polymer-based material overlaps an opposite end of the layered materials; and (d) forming the portions of polymer-based material to a desired shape using the forming tool so that the layers of tensile fabric and elastomer form a live hinge between the first and second portions of polymer-based material.

BRIEF DESCRIPTION OF THE DRAWINGS

These and other features and advantages will become apparent to those skilled in the art in connection with the following detailed description and drawings of one or more embodiments, in which.

DETAILED DESCRIPTION

An enhanced composite live hinge is described below and represents a different approach for live hinge configurations. In this approach, the live hinge is not necessarily formed from the same material(s) as the portions of material it joins. The composite live hinge includes more than one layer of material, making it possible to tailor each layer to perform a specific function and/or address a certain problem with conventional hinge configurations. This approach may be particularly advantageous in applications in which the materials joined by the hinge are too stiff for the live hinge to be formed in a monolithic component without additional material weakening at the desired hinge joint location, such as with structural composites. Some embodiments of the live hinge described herein can also provide nearly unlimited fatigue life with a full 360° angular range of movement. Other advantages will become apparent to skilled artisans.

Figure 1:
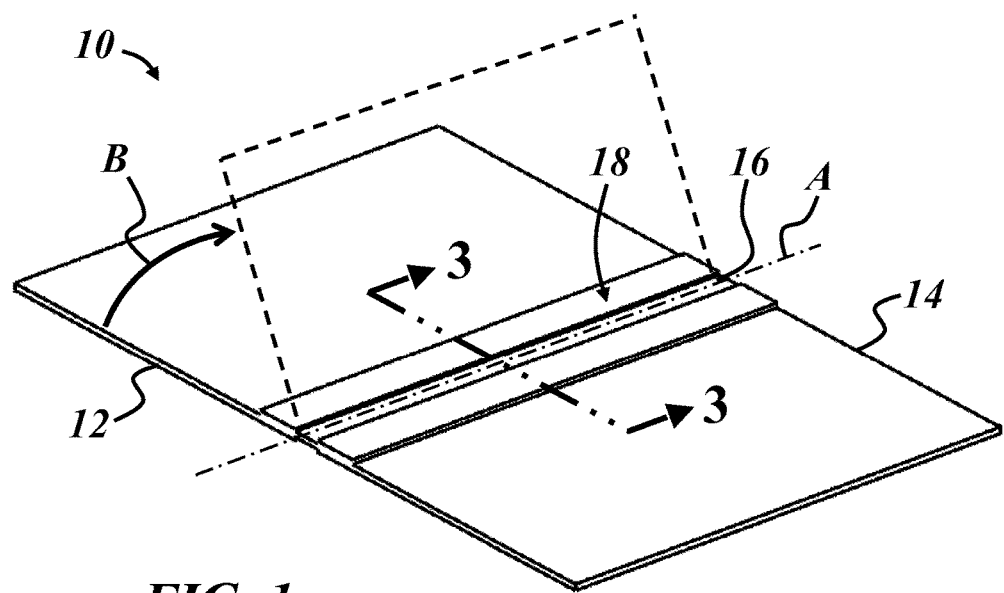
FIG. 1 is an isometric view of an embodiment of a hinged component including a live hinge.
Figure 2:
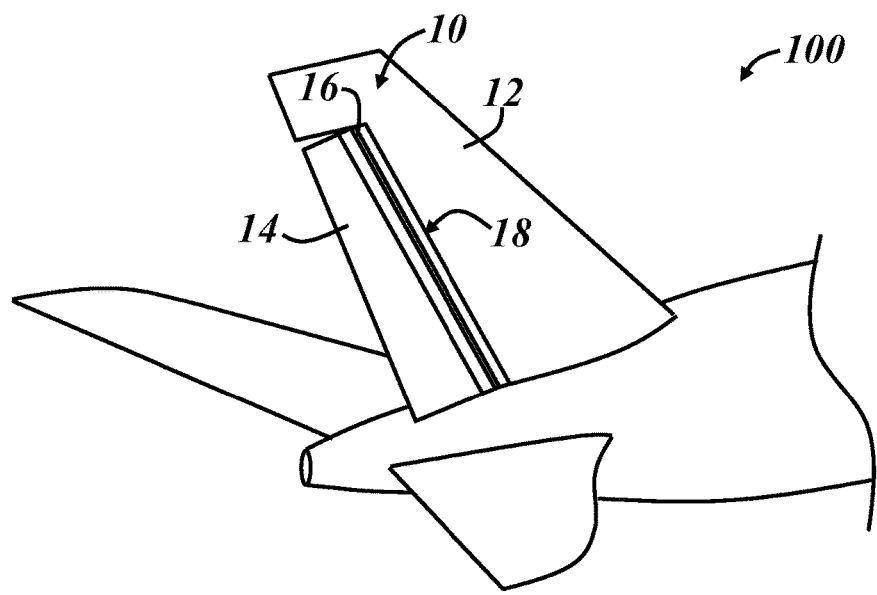
FIG. 2 is a perspective view of a tail portion of an air vehicle, including an embodiment of the hinged component.

An illustrative hinged component 10 is illustrated in FIG. 1 and includes a first portion of material 12, a second portion of material 14, and a live hinge 16 attaching the first and second portions of material together at a hinge region 18. As used herein, a hinge is an element that pivotally couples at least two components or portions of material together with one rotational degree of freedom. A live hinge is a hinge that provides the rotational degree of freedom via flexure or bending rather than relative pivotal motion between pivotably interconnected hinge elements. The live hinge 16 couples the first and second portions 12, 14 together for hinged movement generally about a pivot axis A, though the live hinge does not necessarily define the pivot axis in the same sense as pin and barrel style hinges, for example. The first portion 12 is shown in dashed lines in a position it would be in after having undergone hinged movement relative to the second portion 14 in direction B. In the illustrated example, the coupled portions of material 12, 14 are flat portions of material but could be any shape, depending on the application. In one embodiment, the hinged component 10 is an air vehicle component. For example, FIG. 2 illustrates a tail portion of an air vehicle 100. Here, the vertical stabilizer of an air vehicle includes the hinged component 10 with a stabilizer body 12 of the vertical stabilizer comprising the first portion of the hinged component 10 and a rudder 14 of the vertical stabilizer comprising the second portion of the hinged component 10. The rudder 14 is coupled to the body 12 by live hinge 16 at hinge region 18.

Live hinges are useful in applications such as Radio Control (RC) aircraft and Unmanned Air Vehicles (UAVs), for example, where lightweight structural composites are widely used, and where it is useful to reduce the weight and complexity of moving parts. Other air vehicle components, such as elevators, trim tabs, wings flaps, ailerons, spoilers, slats, etc., may also employ live hinges. These are only a few examples of suitable applications for the composite live hinge described herein, as they may be suitable for use in non-moving air vehicle components and/or non-air vehicle components.

Figure 3:
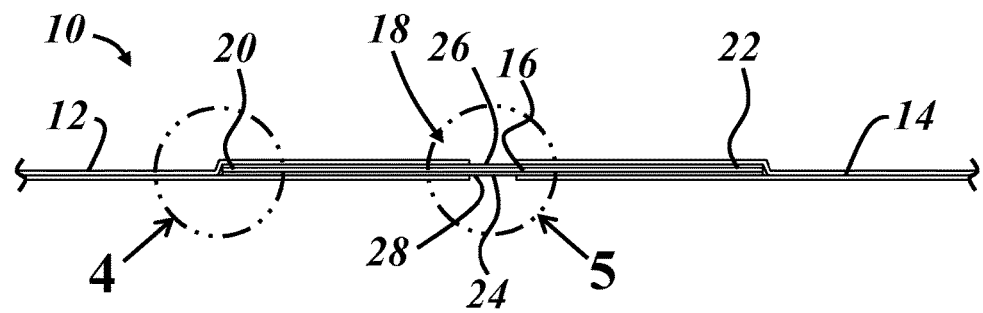
FIG. 3 is a cross-sectional view of the hinged component taken along line 3-3 of FIG. 1.
Figure 4:
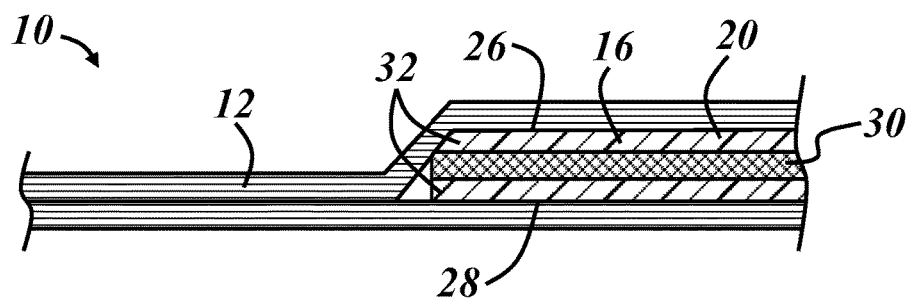
FIG. 4 is an enlarged view of a portion of the hinged component of FIG. 3, showing one end of the live hinge embedded in a portion of material.
Figure 5:
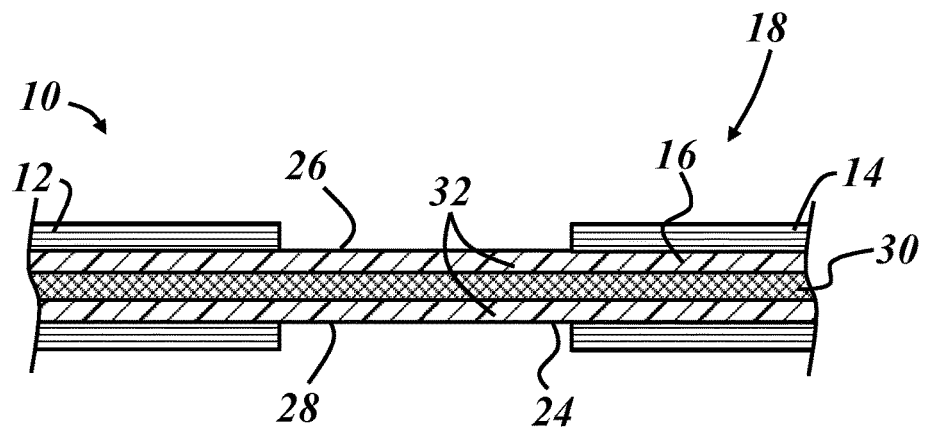
FIG. 5 is an enlarged view of a hinge region of the hinged component of FIG. 3.

FIGS. 3-5 are cross-sectional views showing portions of the hinged component of FIG. 1. FIG. 3 shows opposite ends 20, 22 of the hinge in a single view, FIG. 4 is an enlarged view of one of the ends 20, and FIG. 5 is an enlarged view of a central portion 24 of the hinge. With reference to FIGS. 3-5 as necessary, one end 20 of the hinge 16 is attached to the first portion of material 12, and the opposite end 22 is attached to the second portion of material 14. One or both of the hinge ends 20, 22 may be at least partially embedded in the material of the respective first and second portions 12, 14. In this case, both ends 20, 22 are embedded in the respective portions of material, and the central portion 24 of the hinge is exposed (i.e., not covered or concealed by the materials of the joined portions 12, 14). Both of opposite sides 26, 28 of the hinge 16 may be exposed as shown, or only one side may be exposed. It is also possible to construct the hinged component 10 so that none of the hinge 16 is exposed. Techniques for embedding portions of the hinge 16 in the joined portions 12, 14 are described in further detail below, and this is only one manner of attaching the hinge 16 to portions 12, 14. For example, the hinge 16 could have one or both of its opposite ends 20, 22 bonded, embedded or otherwise attached directly to one side of each of portions 12, 14.

The illustrated hinge 16 includes a layer of tensile fabric 30 and a layer of elastomer 32 interposed between the tensile fabric and the materials of the first and second portions 12, 14 at locations where the live hinge 16 is attached to each of the portions of material. This is best shown in FIG. 4, where one end 20 of the hinge 16 is embedded in the material of first portion 12. In this particular example, the tensile fabric 30 is interposed between two layers of elastomer 32, and each layer of elastomer is interposed between the tensile fabric and the materials of the first and second portions at the hinge attachment locations. Stated differently, hinge 16 includes the layer of tensile fabric 30 interposed or sandwiched between two layers of elastomer 32, and portions of the hinge 16—in this case, opposite ends 20, 22—are interposed between layers of the first and second material portions 12, 14. The layer(s) of elastomers 32 may extend between the opposite ends 20, 22 of the hinge and/or be coextensive with the layer of tensile fabric 30, as shown, or the elastomers may be present only where the hinge 16 is attached to the corresponding material portion 12, 14.

The layered structure of the composite hinge 16 enables customization of hinge properties and characteristics not possible with live hinges formed from a single piece of material. For example, the layer of tensile fabric 30 may be selected to optimize or maximize the strength of the composite hinge 16, without regard for whether the selected material for layer 30 is compatible with the portions of material 12, 14 it helps join in hinged fashion. Likewise, the layer(s) of elastomer 32 may be selected to optimize or maximize flexibility of the hinge 16, without regard for its strength or ability to hold the two portions 12, 14 together on its own. Examples of suitable materials for the layer of tensile fabric 30 and the elastomer 32 are given below.

The layer of tensile fabric 30 may be a layer of material with major dimensions in two Cartesian directions (i.e., in a plane) and a relatively small thickness in the third Cartesian dimension. The strength properties of the tensile fabric 30 may be significant only in the planar directions, which is to say that tensile properties of the tensile fabric may not be practically measurable for a given sample in any out-of-plane direction. Suitable types of materials for the layer of tensile fabric 30 are virtually unlimited and may include polymeric or metallic materials, natural or synthetic materials, woven or non-woven materials, and layered or non-layered materials, for example. In one embodiment, the layer of tensile fabric 30 includes or is a mesh material. A mesh material is generally a material made up of strands of solid material arranged in one or more directions in the plane of the layer with open spaces between at least some of the individual strands. Some examples include woven or knitted material, screening or netting. The solid portion of the mesh material may be polymeric, metallic, glass, carbon fibers, or any other material or combination of materials. Some examples of polymeric materials suitable for use as the mesh material include polyamides (i.e., nylon) or polyesters. One suitable mesh material is RVB mesh, available from Airtech Europe Sarl (Luxembourg). One advantage of mesh materials is that material from the illustrated elastomer layers 32 can extend through the open portions of the mesh to interconnect or fuse together during formation of the live hinge, consistent with the exemplary methods described in more detail below. The thickness of the layer of tensile fabric 30 may be in a range from about 0.1 to about 0.5 mm. In one specific example, the thickness of the layer 30 is about 0.3 mm. The layer of tensile fabric 30 may itself be formed from multiple layers or sublayers of material. For example, the tensile fabric 30 may include a plurality of unidirectional layers of fibers, such as glass fibers, with each layer having the fibers oriented in different directions within the plane of the layer.

The layer or layers of elastomer 32 may be formed from any type of elastomer, such as natural rubber or any synthetic elastomer (e.g., a thermoplastic elastomer or a curable or thermoset elastomer). The elastomer may be selected and used to help protect the layer of tensile fabric 30 during processing and/or during hinge use. For example, the layer of elastomer 32 can help prevent components of the material from portions 12, 14 of the hinged component from infusing into or impregnating the layer of tensile fabric 30. In addition, the layer of elastomer can help protect the layer of tensile fabric from exposure to the environment (e.g. UV exposure, moisture, etc.) during hinge service. The elastomer may also provide an intermediate material that can bond with both the layer of tensile fabric 30 and the material of the first and second portions, thus facilitating attachment of the hinge 16 to portions 12, 14. Examples of suitable materials for use in the layer of elastomer material 32 include fluoroelastomer compounds available from Eagle Elastomer, Inc. (Cuyahoga Falls, Ohio). Fluoroelastomers may provide certain benefits, such as high-fatigue life, resistance to weathering, and resilience to adhesion with other materials. For example, fluoroelastomers may offer certain processing advantages because, where the central portion 24 of the hinge is exposed, the exposed portion remains free of unwanted constituents that may stiffen the hinge or otherwise affect its flexibility. Silicone elastomers may provide similar benefits. When combined with the layer of tensile fabric 30, the importance of the tensile strength or tear strength of the elastomer layer becomes less significant, as those hinge properties can be provided by the tensile fabric. Each layer of elastomer may itself include multiple layers or sublayers of elastomer.

Consistent with the description of the methods below, another consideration for the layer of elastomer 32 is its ability to bond with the material of the first and second portions 12, 14 of the hinged component. For example, the elastomer may be selected so that cross-links are formed between the layer of elastomer and the material of portions 12, 14. Where multiple layers of elastomer are used, as shown in the figures, each layer may have the same or different composition. The thickness of each layer of elastomer material 32 may be in a range from about 0.1 to about 0.5 mm. In one specific example, the thickness of the layer(s) 32 is about 0.3 mm. Each of the individually illustrated layers of elastomer 32 may itself be formed from multiple layers or sublayers of elastomer, as well.

Each of the first and second portions 12, 14 of the hinged component may include a polymeric constituent. For example, each of portions 12, 14 may be a reinforced polymer composite with reinforcing fibers or particles distributed in a polymeric matrix. One example of a reinforced polymer composite is an injection molding grade of glass-filled polyamide material. Another example of a reinforced polymer composite is a structural composite including a thermoset polymer matrix, such as epoxy, polyester, or acrylic matrix. The reinforcing fibers may be glass, organic (e.g. polyaromatic), carbon, metallic, or any other suitable material. Some examples of structural composite materials that could serve as first and/or second portions 12, 14 are primarily composed of the reinforcing material. For example, glass or Kevlar fibers or mats of fibers may be impregnated with a curable resin to form structural composite portions 12, 14. In one embodiment, the reinforcing fibers of the first and second portions of material 12, 14 and the layer of tensile fabric 20 are the same material (e.g., Kevlar fibers), with the fibers of the first and second portions being impregnated with a polymer resin and the fibers of the tensile fabric being substantially free of the polymer resin of portions 12, 14. In another embodiment, the reinforcing fibers of the first and second portions 12, 14 and the tensile fabric are different material types. As used in this context, a different material type is a material that is different in composition and/or form from another material. For example, a polyester tensile fabric and Kevlar reinforcing fibers are different material types because of the different material composition, even if both are in woven form. Likewise, chopped glass reinforcing fibers and woven glass fiber tensile fabric are different material types because of their different form, even though both have a glass composition. Also, different material compositions of the same material family constitute different material types, such as nylon 6 compared to nylon 6,6 or two different glass chemistries. The first and second portions could also be formed from unreinforced polymeric materials. Polymeric materials with reactive groups that can form cross-links with the layer(s) of elastomer material 32 may be preferred. First and second portions 12, 14 with polymeric components may facilitate encapsulating or embedding of desired portions of the composite hinge 16 as shown in the figures. But the composite hinge 16 described herein could be used to form a hinge joint between other types of material portions.

In the illustrated example, each of the first and second portions of material 12, 14 includes multiple layers of material, with the layers being separated where they overlap with the hinge, but adjacent one another as a single layer of thicker material outside the hinge region, as is best shown in FIG. 4. Stated differently, in the embodiment shown in the figures, the ends 20, 22 of the hinge 16 are interposed between layers of material portions 12, 14. Thus, the hinged component 10 is thicker where the hinge 16 is attached to the first and second portions 12, 14 than it is at locations away from the hinge attachment locations. In configurations where the central portion 24 of the hinge 16 is exposed, the hinged component 10 is also thinner at the central portion of the hinge than at the opposite ends 20, 22 of the hinge. In such embodiments, the hinge 16 thus forms a portion of the opposite surfaces of the hinged component 10 where it interconnects the first and second portions of material 12, 14.

Figure 6:
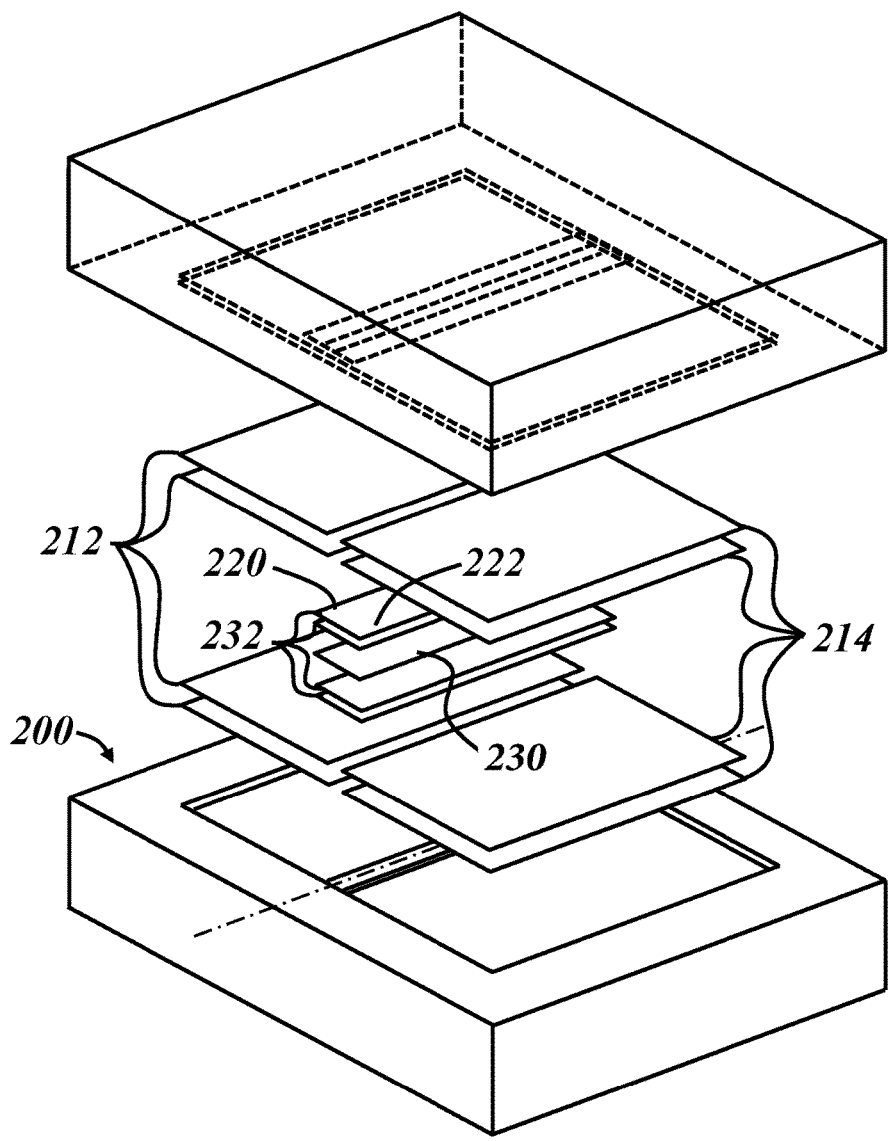
FIG. 6 is an isometric view of an illustrative forming tool for the composite live hinge.
Figure 7:
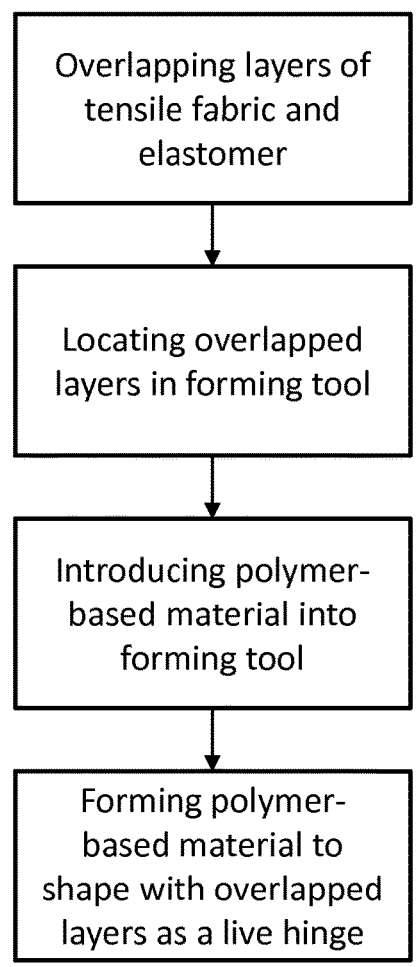
FIG. 7 is a process flow chart summarizing one embodiment of a method of making the hinged component with the composite live hinge.

Reference is made to FIGS. 6 and 7 to describe an illustrative method of making the hinged component. FIG. 6 illustrates an exemplary forming tool 200 for the above-described hinged component, and FIG. 7 is a process flow chart summarizing the illustrative method. The method may include the following steps: overlapping a layer of tensile fabric 230 with a layer of elastomer 232, locating the layers 230, 232 in the component forming tool 200, introducing polymer-based material into the forming tool 200, and forming the portions of polymer-based material 212, 214 to a desired shape. The step of introducing polymer-based material into the forming tool 200 is performed so that a first portion of polymer-based material 212 overlaps one end 220 of the layered materials and a second portion of polymer-based material 214 overlaps an opposite end 222 of the layered materials, and the step of forming is performed so that the layers of tensile fabric 230 and elastomer 232 form the live hinge 16 between the first and second portions of polymer-based material, which correspond to the first and second portions 12, 14 of the finished hinged component 10.

In the example of FIG. 6, the polymer-based material that is introduced to the forming tool is in the form of curable sheets of pre-preg material, consistent with a layup process for structural panels. In this particular example, multiple sheets of pre-preg material are provided for each of the first and second portions, with two layers of pre-preg overlapping the underside of the layered hinge components 230, 232 and two layers overlapping the topside of the layered components 230, 232. Pre-preg material includes reinforcing fibers impregnated with a thermosetting resin that is only partially cured—i.e., sufficiently cured for purposes of handling, but sufficiently uncured to allow the resin to be shaped under heat and/or pressure. Here, also, multiple layers of elastomer 232 are provided. Various arrangements of material layers may be used, including multiple layers of tensile fabric 230 with or without interposed layers of elastomer, etc.

In the illustrated example, the method also includes the step of curing the pre-preg material while it is in the desired shape of the hinged component. Surfaces of the forming tool 200 are configured to provide the desired shape. This process illustrates additional criteria that may be used when selecting hinge materials, in that the tensile fabric and the elastomer of the hinge must be capable of withstanding the forming conditions (temperature, pressure, etc.) when embedded or overmolded as described here. For example, either one or both of the tensile fabric 230 or the elastomer 232 may be provided as curable materials so that one or both are co-cured with the pre-preg sheets of material. In one example, the elastomer 232 is provided as a curable material and, under the heat and pressure of the forming step, flows at least partially through the tensile fabric and co-cures with the pre-preg material, thus forming an elastomer-infused tensile fabric layer at the core of the composite hinge 16. In another example, the elastomer 232 is provided in the form of a material with reactive groups that react with the polymer portion of the pre-preg material to form cross-links (i.e., covalent chemical bonds) between the elastomer and the material of the first and second portions of material where the materials overlap in the forming tool.

The method can also be performed so that the hinged component includes thermoplastic materials as the first and second portions. For example, the step of introducing polymer-based material to into the forming tool 200 may include injecting a reinforced or unreinforced molten thermoplastic resin into a mold cavity of the tool in an overmolding operation. In this embodiment, the tool surfaces are cooled instead of heated to solidify the molten resin. In either case, the layer or layers of elastomer 232 can be arranged in the forming tool to substantially prevent the polymer-based material from infiltrating the tensile fabric 230. This allows the layer of tensile fabric to maintain its fabric-like character in the finished hinged component, whereas, without the elastomer layer or layers helping to prevent polymer infiltration, the tensile fabric could become impregnated with polymer resin from the first and second portions of material which, when hardened or cured, would make rigidify the tensile layer to the stiffness of the joined first and second portions. Where resin from the first and second portions 12, 14 (or 212 and 214 in FIG. 6) infiltrates the fibers of the tensile layer of the hinge—such as in the absence of the protective layers of elastomer—the finished component would require further scoring or other weakening along the desired hinge line in order to allow the hinge to bend. This type of additional weakening along the hinge line is undesirable, as it can damage the fibers of the tensile layer.

This is one of the problems presented when attempting to form a traditional live hinge from a single piece of structural composite material. Such materials are simply too stiff and strong to form a live hinge without breaking at least some of the reinforcing fibers and thus necessarily weakening the material at the hinge joint. Where scoring is used in such examples, the flexibility of the hinge joint is somewhat dependent on which side of the material is scored, cut, or otherwise weakened—i.e., the resulting hinge joint may be more flexible in one direction of pivoting than in the other direction. The composite live hinge described above can be made without scoring any portion of the hinged component along the desired hinge region so that the materials used to form the hinge maintain their full strength with no unnecessary stress concentrators along the finished component.

The resulting composite hinge 16 also provides design redundancy. For example, even in the elastomer layer is in some way damaged or reaches a point of fatigue, the tensile fabric continues to hold the first and second portions of the hinged component together. Mechanical testing of experimental samples of the above described composite hinge indicates that, after a 100,000 use cycle, the hinge is fully functional, even if the outermost layers of elastomer are completely failed. Moreover, the composite hinge has a liner life cycle that is not negatively impacted over time, unlike traditional live hinges formed in composite materials, which are continually progressing toward laminate failure and require an initial break-in period.

It is to be understood that the foregoing is a description of one or more illustrative embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A hinged component, comprising:
   a first portion of material;
   a second portion of material;
   a first layer of elastomer;
   a live hinge attaching the first and second portions of material together at a hinge region, the live hinge comprising a layer of tensile fabric at least partially infiltrated by at least part of the first layer of elastomer;
   at least part of the first layer of elastomer being interposed between the tensile fabric and material of the first and second portions;
   at least one of the portions of material including a structural composite comprising reinforcing fibers in a polymer matrix; and
   the first layer of elastomer being co-cured with at least one of the portions of material.

2. The hinged component of claim 1, wherein the first layer of elastomer and at least one of the first and/or second portions of material are cross-linked together by covalent bonds.

3. The component of claim 1, wherein the reinforcing fibers and the tensile fabric are different material types.

4. The component of claim 1, wherein the first layer of elastomer and at least one of the first and second portions of material are cross-linked together where the live hinge is attached to each of the first and second portions.

5. The component of claim 1, wherein the tensile fabric is a polymeric mesh material.

6. The component of claim 1, wherein the first layer of elastomer comprises a fluoroelastomer.

7. The hinged component of claim 1, wherein:
   the live hinge includes a second layer of elastomer; and
   the tensile fabric is interposed between the first layer of elastomer and the second layer of elastomer, each of the first and second layers of elastomer being interposed between the tensile fabric and the materials of the first and second portions of material where the live hinge is attached to each of the first and second portions.

8. The hinged component of claim 1, wherein the live hinge includes one end attached to the first portion of material and an opposite end attached to the second portion of material, and at least one of the ends is at least partially embedded in the respective portion of material.

9. The hinged component of claim 1, wherein the live hinge includes one end attached to the first portion of material and an opposite end attached to the second portion of material, and the first layer of elastomer extends between the ends.

10. The hinged component of claim 1, wherein the layer of tensile fabric and the first layer of elastomer are coextensive.

11. The hinged component of claim 8, wherein opposite ends of the live hinge are embedded in the respective first and second portions of material and a central portion of the live hinge is exposed.

* * * * *